US012654783B2

(12) United States Patent
Onishi et al.

(10) Patent No.: US 12,654,783 B2
(45) Date of Patent: Jun. 16, 2026

(54) VEHICLE CONTROL SYSTEM FOR CONTROLLING LEFT AND RIGHT FAIRING DEVICES INDEPENDENTLY IN RESPONSE TO NATURAL WIND

(71) Applicant: Honda Motor Co., Ltd., Tokyo (JP)

(72) Inventors: Yasuyuki Onishi, Saitama (JP); Yasutaka Masumitsu, Saitama (JP); Jun Sawada, Saitama (JP); Yoji Suwa, Saitama (JP); Takumi Ikawa, Saitama (JP); Yuya Sugawara, Yokohama (JP)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 18/590,950

(22) Filed: Feb. 29, 2024

(65) Prior Publication Data

US 2024/0351643 A1 Oct. 24, 2024

(30) Foreign Application Priority Data

Apr. 24, 2023 (CN) .......................... 202310445629.6

(51) Int. Cl.
*B62D 35/00* (2006.01)
(52) U.S. Cl.
CPC .................................. *B62D 35/005* (2013.01)
(58) Field of Classification Search
CPC .............................. B62D 37/02; B62D 35/005
See application file for complete search history.

(56) References Cited

U.S. PATENT DOCUMENTS

| | | | |
|---|---|---|---|
| 10,953,934 B2 | 3/2021 | Herlem | |
| 11,780,511 B2* | 10/2023 | Wang | B60J 1/20 |
| | | | 296/180.5 |
| 2010/0201152 A1* | 8/2010 | Smith | B62D 35/001 |
| | | | 296/180.3 |
| 2017/0106922 A1* | 4/2017 | Povinelli | B62D 37/02 |
| 2020/0284819 A1* | 9/2020 | Dumont | B61L 15/0058 |

FOREIGN PATENT DOCUMENTS

| | | |
|---|---|---|
| JP | 2022052388 | 4/2022 |

\* cited by examiner

*Primary Examiner* — Christian Chace
*Assistant Examiner* — Shayne M. Gilbertson
(74) *Attorney, Agent, or Firm* — JCIPRNET

(57) ABSTRACT

Disclosed is a vehicle control system that may improve the aerodynamic performance of the vehicle. The vehicle control systems includes: a pair of left and right fairing devices, which are disposed in front of a pair of left and right wheels of the vehicle, and are each movable between a first storage position under the vehicle and a first deployment position protruding from the first storage position toward the lower part of the vehicle; a natural wind detection device disposed on the vehicle to detect the direction of the natural wind relative to the vehicle; and a control device disposed on the vehicle and controlling a pair of left and right fairing devices to move independently in response to the direction of the natural wind.

7 Claims, 8 Drawing Sheets

100

VEHICLE CONTROL SYSTEM FOR CONTROLLING LEFT AND RIGHT FAIRING DEVICES INDEPENDENTLY IN RESPONSE TO NATURAL WIND

CROSS-REFERENCE TO RELATED APPLICATION

This application claims the priority benefit of China application no. 202310445629.6, filed on Apr. 24, 2023. The entirety of the above-mentioned patent application is hereby incorporated by reference herein and made a part of this specification.

BACKGROUND

Technical Field

The disclosure relates to a vehicle control system.

Description of Related Art

In recent years, in order to ensure access to affordable, reliable, sustainable, and advanced energy for more people, research and development to improve fuel efficiency that contribute to energy efficiency are being carried out. However, in this technology related to improvement of fuel efficiency, aerodynamic performance of vehicles remains to be an issue.

In the related art (U.S. Publication Ser. No. 10/953,934), a pair of left and right fairing devices may normally be disposed at the lower end of the vehicle body (for example, in front of a pair of left and right wheels) to improve the aerodynamic performance of the vehicle. A common fairing device may be a fixed fairing with a specific shape. Currently, a movable fairing device may also be adopted, and the movable part of which may move in the up and down direction of the vehicle relative to the fixed part to change the position of the movable part, thereby adjusting the aerodynamic performance of the vehicle. However, in order to further improve the aerodynamic performance of the vehicle, it is necessary to consider the direction of the natural wind flowing through the vehicle when the vehicle is driving, thereby improving the aerodynamic performance of the vehicle more precisely.

In order to solve the above-mentioned problems, the present disclosure aims to improve the aerodynamic performance of the vehicle, and further contributes to energy efficiency.

SUMMARY

The disclosure provides a vehicle control system that may improve aerodynamic performance of vehicles.

The present disclosure provides a vehicle control system, including: a pair of left and right fairing devices, which are disposed in front of a pair of left and right wheels of the vehicle, and are each movable between a first storage position under the vehicle and a first deployment position protruding from the first storage position toward the lower part of the vehicle; a natural wind detection device disposed on the vehicle to detect the direction of the natural wind relative to the vehicle; and a control device disposed on the vehicle and controlling a pair of left and right fairing devices to move independently in response to the direction of the natural wind.

Based on the above, in the vehicle control system of the present disclosure, the left and right fairing devices are each movable between the first storage position under the vehicle and the first deployment position protruding from the first storage position toward the lower side of the vehicle. The natural wind detection device detects the direction of the natural wind relative to the vehicle, and the control device controls a pair of left and right fairing devices to move independently in response to the direction of the natural wind. In this way, the pair of left and right fairing devices may respectively move to their respective storage or deployment position in response to the direction of the natural wind, thereby more precisely adjusting the airflow guided by the pair of left and right fairing devices according to the actual situation. Accordingly, the vehicle control system of the present disclosure may improve the aerodynamic performance of the vehicle.

In order to make the above-mentioned features and advantages of the present disclosure more obvious and understandable, embodiments are given below and described in detail with reference to the accompanying drawings.

DESCRIPTION OF THE EMBODIMENTS

Figure 1:
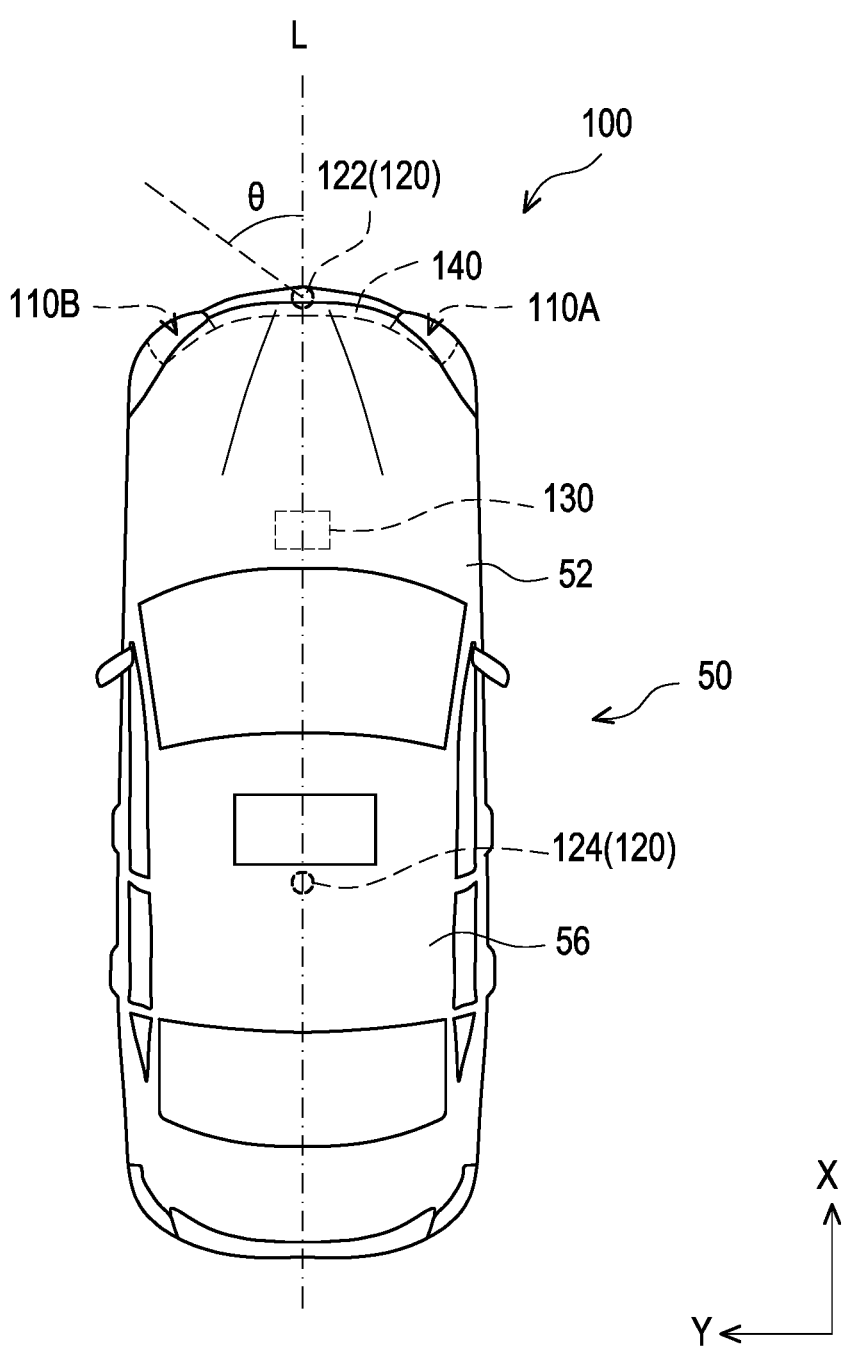
FIG. 1 is a schematic top view of a vehicle applied to a vehicle control system according to an embodiment of the present disclosure.
Figure 2:
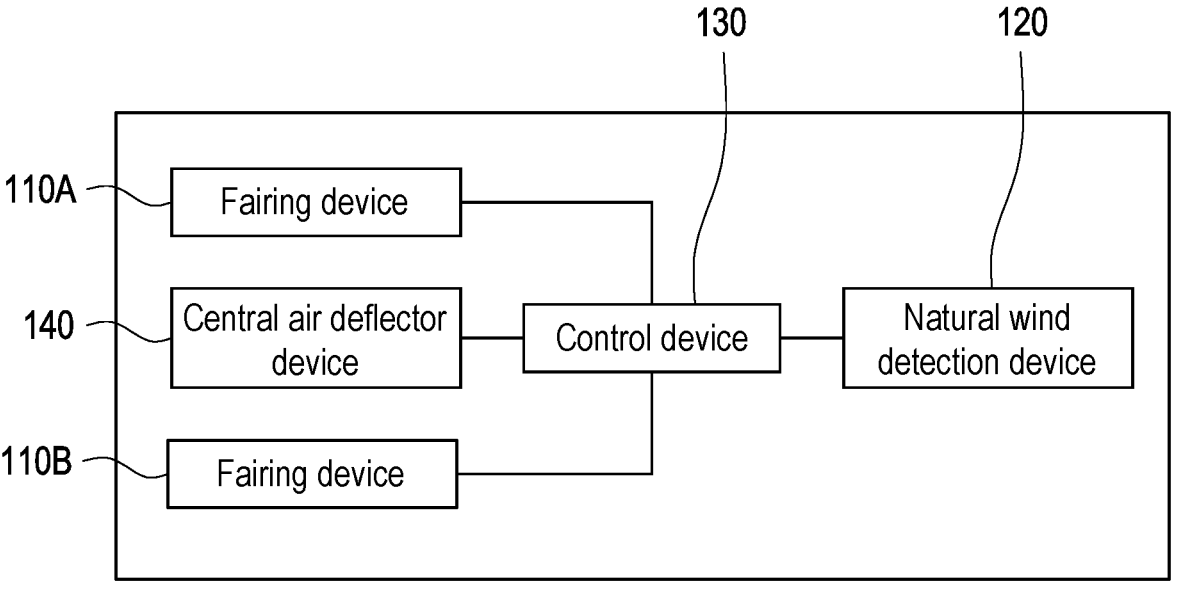
FIG. 2 is a schematic view of an electrical structure of the vehicle control system shown in FIG. 1.
Figure 3:
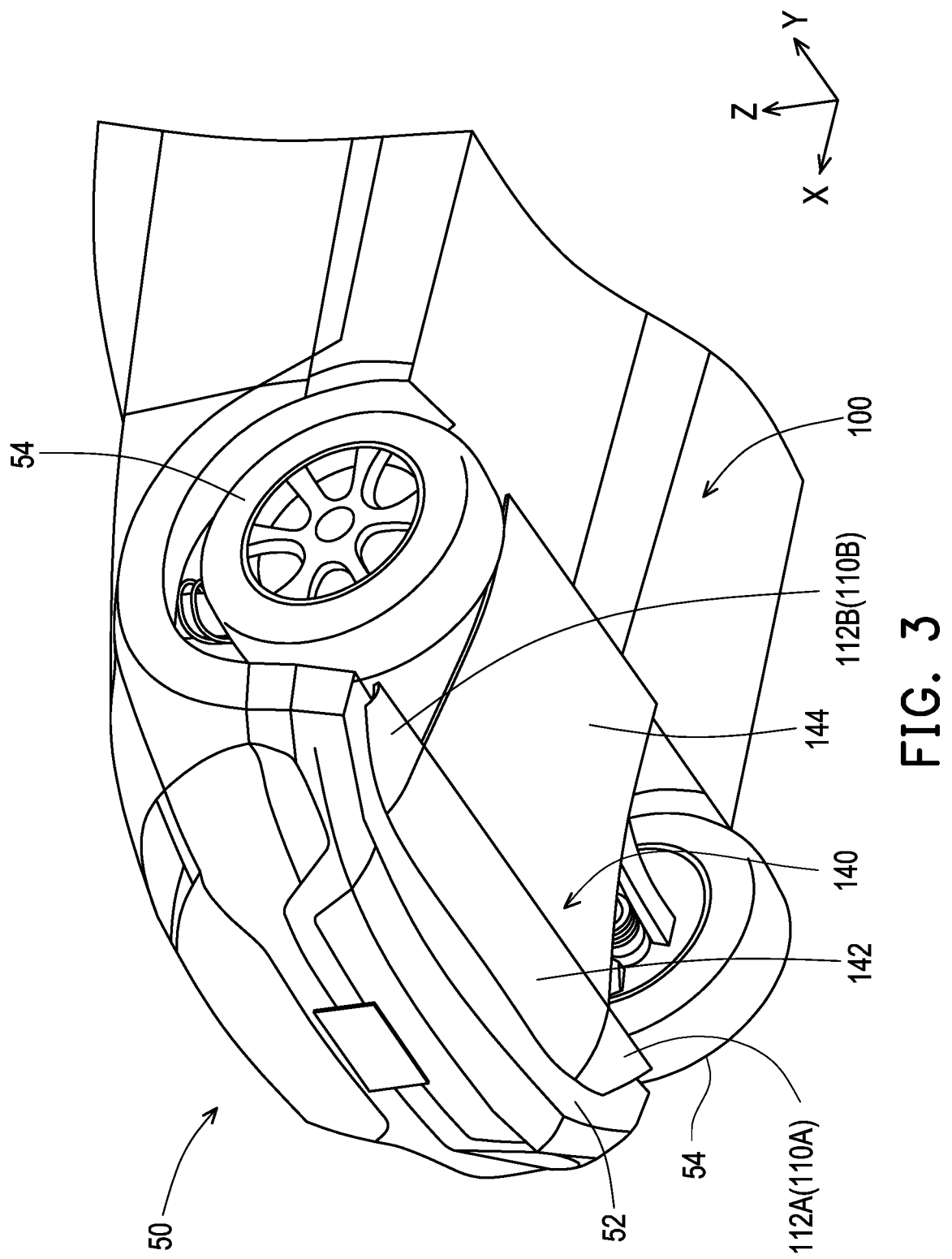
FIG. 3 is a schematic view of a pair of left and right fairing devices and a central air deflector device used in the vehicle control system shown in FIG. 1 disposed in the vehicle bottom structure.
Figure 4A:
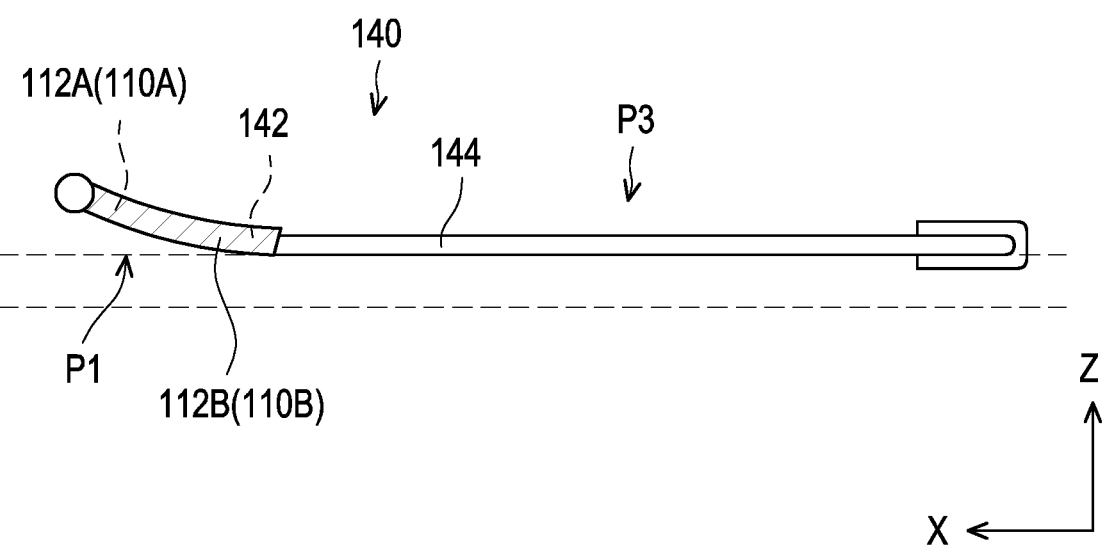
FIG. 4A to FIG. 4D are schematic views of a pair of left and right fairing devices used in the vehicle control system shown in FIG. 1 when they are in their respective storage positions and deployment positions.
Figure 5:
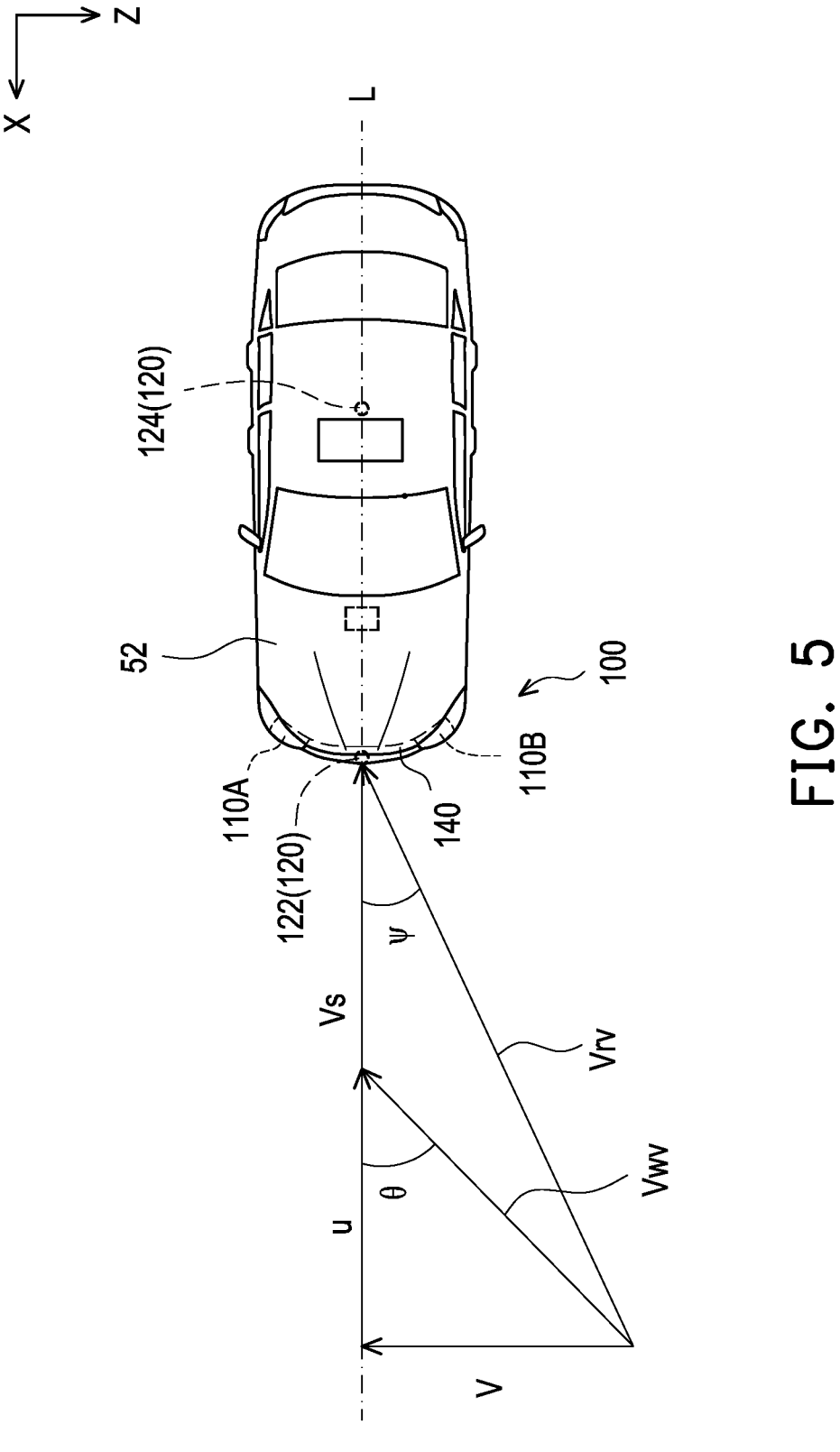
FIG. 5 is a schematic view of the operation of the vehicle control system shown in FIG. 1 for detecting angles based on the direction of natural wind.
Figure 6:
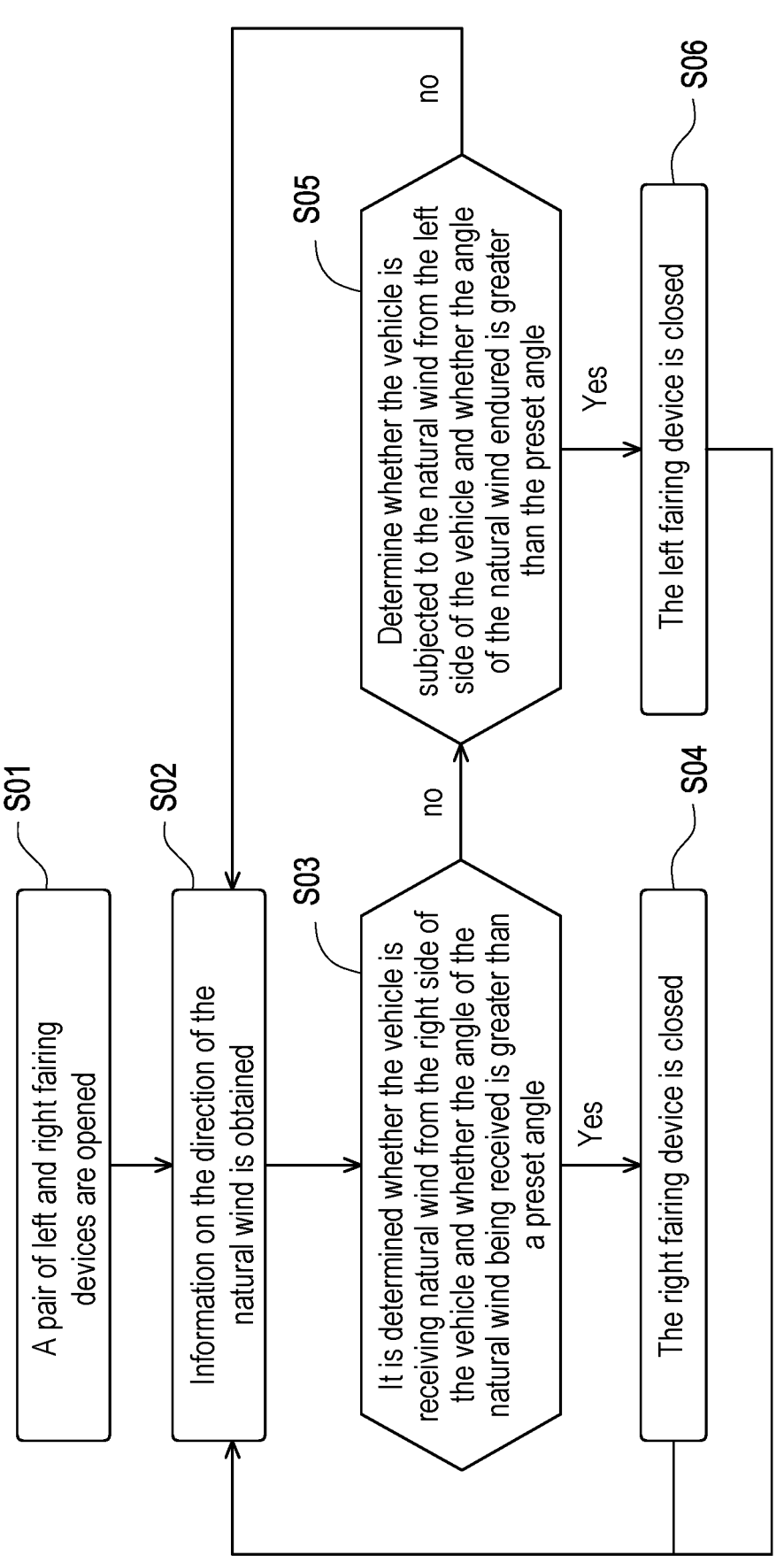
FIG. 6 is a schematic view of the operation flow of the vehicle control system shown in FIG. 1 controlling a pair of left and right fairing devices in response to the direction of natural wind.
Figure 7:
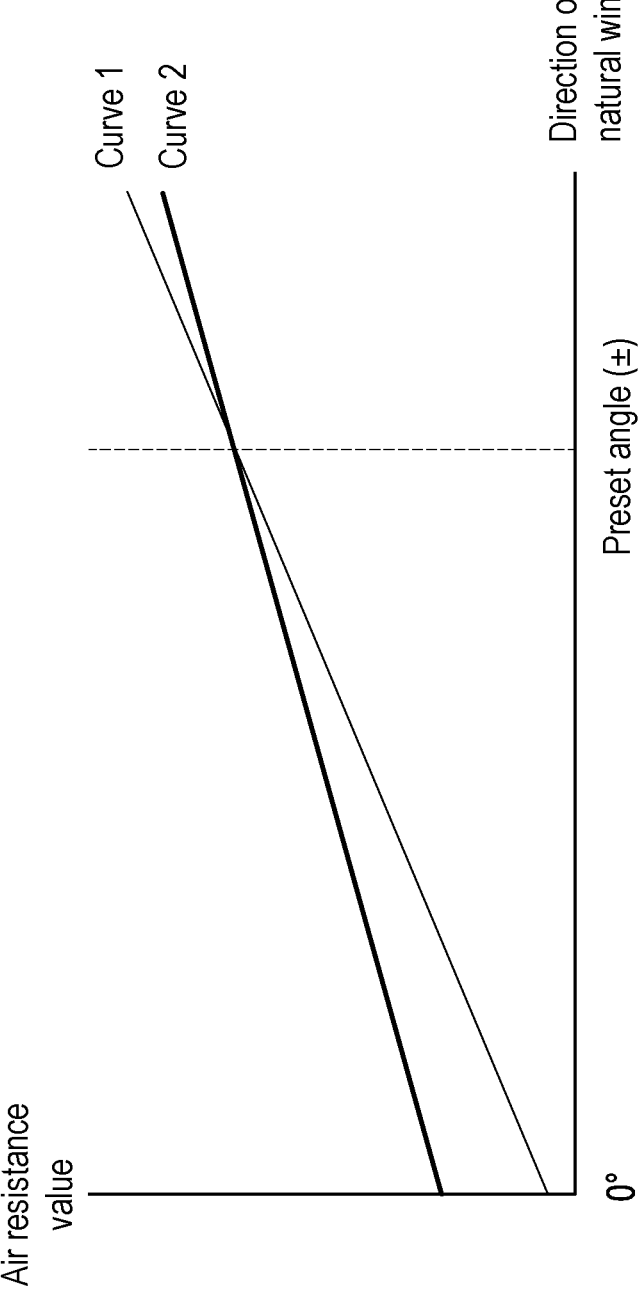
FIG. 7 is a curve diagram of a preset angle derived from the air resistance value of the vehicle relative to the direction of the natural wind obtained through simulation or experiment by the vehicle control system shown in FIG. 1.

Reference will now be made in detail to the exemplary embodiments of the present disclosure, examples of which are illustrated in the accompanying drawings. FIG. 1 is a schematic top view of a vehicle applied to a vehicle control system according to an embodiment of the present disclosure. FIG. 2 is a schematic view of an electrical structure of the vehicle control system shown in FIG. 1. FIG. 3 is a schematic view of a pair of left and right fairing devices and a central air deflector device used in the vehicle control system shown in FIG. 1 disposed in the vehicle bottom structure. FIG. 4A to FIG. 4D are schematic views of a pair of left and right fairing devices used in the vehicle control system shown in FIG. 1 when they are in their respective storage positions and deployment positions. FIG. 5 is a schematic view of the operation of the vehicle control system shown in FIG. 1 for detecting angles based on the direction of natural wind. FIG. 6 is a schematic view of the operation flow of the vehicle control system shown in FIG. 1 controlling a pair of left and right fairing devices in response to the direction of natural wind. FIG. 7 is a curve diagram of a preset angle derived from the air resistance value of the vehicle relative to the direction of the natural wind obtained through simulation or experiment by the vehicle control system shown in FIG. 1. The application, specific structure, etc. of the vehicle control system 100 of this embodiment will be described below with reference to FIG. 1 to FIG. 7. The front and rear directions of the vehicle described later refer to, for example, the front and rear direction X in the drawings and the direction pointed by the arrow is the front direction, the left and right direction of the vehicle refers to the left and right direction Y in the drawings, and the direction pointed by the arrow is the left direction, and the up and down direction of the vehicle refers to the up and down direction Z in the drawing, and the direction pointed by the arrow is the upward direction, but which is only an example of the present disclosure, and the present disclosure is not limited thereto.

In an embodiment of the present disclosure, the natural wind detection device detects an angle of the direction of the natural wind relative to the forwarding direction of the vehicle.

In an embodiment of the present disclosure, the natural wind detection device detects the pressure value of the natural wind, and the angle of the direction of the natural wind relative to the forwarding direction of the vehicle is determined by calculating the pressure value.

In an embodiment of the present disclosure, when the angle of the direction of the natural wind relative to the forwarding direction of the vehicle is greater than a preset angle, the control device controls one of the left and right fairing devices corresponding to the direction of the natural wind to move to the first storage position.

In an embodiment of the present disclosure, when the vehicle is subjected to natural wind from one of the left and right sides of the vehicle, the control device controls one of the left and right fairing devices corresponding to the direction of the natural wind to move to the first storage position, and controls another of the fairing devices to move to the first deployment position.

In an embodiment of the present disclosure, the vehicle control system further includes: a central air deflector device, which is disposed in the middle position of the vehicle width direction of the vehicle and between a pair of left and right fairing devices, and movable between a second storage position under the vehicle and a second deployment position protruding from the second storage position to the lower part of the vehicle, and the control device controls the movement of the central air deflector device. Moreover, when the other fairing device of the pair of left and right fairing devices moves to the first deployment position, the control device controls the central air deflector device to move to the second deployment position.

Please refer to FIG. 1 to FIG. 3. In this embodiment, the vehicle control system 100 includes a pair of left and right fairing devices 110A and 110B, a natural wind detection device 120, and a control device 130. The pair of left and right fairing devices 110A and 110B are suitable for being disposed on the vehicle body 52 of the vehicle 50 as exterior devices to stabilize the airflow flowing through the vehicle 50, thereby improving the aerodynamic performance of the vehicle 50. A pair of left and right fairing devices 110A and 110B are disposed in front of a pair of left and right wheels 54 disposed at the lower end of the vehicle body 52 of the vehicle 50 (that is, in the direction indicated by the arrow in the front and rear direction X), and the pair of left and right fairing devices 110A and 110B are each movable between a first storage position P1 under the vehicle 50 and the first deployment position P2 protruding from the first storage position P1 toward the lower part of the vehicle 50 (that is, in the opposite direction to the direction indicated by the arrow representing the up and down direction Z) (as shown in FIG. 4A to FIG. 4D). Moreover, as shown in FIG. 1, the natural wind detection device 120 is disposed on the vehicle 50 to detect the direction of the natural wind relative to the vehicle 50. The control device 130 is disposed on the vehicle 50 and controls the pair of left and right fairing devices 110A and 110B to move independently in response to the direction of the natural wind. However, the present disclosure does not limit the application of the vehicle control system 100 to the vehicle 50, and may be adjusted according to requirements.

Specifically, in this embodiment, the pair of left and right fairing devices 110A and 110B each include, for example, a fairing body 112A and 112B (for example, a single plate) disposed in front of a pair of left and right wheels 54, and a movable mechanism that is not shown (for example, linkage mechanisms, sliding mechanisms, etc.), and each is electrically connected to the control device 130, so as to be movable between the first storage position P1 and the first deployment position P2 respectively under the control of the control device 130. For example, when the vehicle speed of the vehicle 50 does not reach the first predetermined speed, etc., when the fairing devices 110A and 110B are each moved to the first storage position P1 under the control of the control device 130, the fairing bodies 112A and 112B of the fairing devices 110A and 110B are stored under the vehicle 50, and as shown in FIG. 3, the corresponding wheel 54 is exposed when viewed from the front to the rear of the vehicle 50 (not overlapping with the corresponding wheel 54 in the front and rear direction X). Furthermore, for example, when the vehicle speed of the vehicle 50 is equal to or higher than the first predetermined speed, when the fairing devices 110A and 110B are each moved to the first deployment position P2 under the control of the control device 130, the fairing bodies 112A and 112B of the fairing devices 110A and 110B protrude from the first storage position P1 toward the lower part of the vehicle 50 through the driving of their respective movable mechanisms, and the corresponding wheel 54 is at least partially shielded when viewed from the front to the rear of the vehicle 50 (overlapping the corresponding wheel 54 in the front and rear direction X), thus changing the airflow around the fairing devices 110A and 110B. Furthermore, the fairing devices 110A and 110B may be controlled by the control device 130 to simultaneously move to the first storage position P1 (shown in FIG. 4A), simultaneously move to the first deployment position P2 (shown in FIG. 4B), or one of them moves to the first storage position P1 and the other moves to the first deployment position P2 (as shown in FIG. 4C and FIG. 4D). Here, the fairing devices 110A and 110B refer to front fairing devices disposed in front of the wheels 54 provided on the vehicle body 52 of the vehicle 50. However, the present disclosure does not limit the specific structures of the fairing devices 110A and 110B, which may be adjusted according to needs. For example, the control device 130 is disposed to electrically drive the movable mechanism to move the fairing bodies 112A and 112B, but the disclosure is not limited thereto. A mechanism for absorbing the traveling wind or natural wind of the vehicle 50 may also be provided, and changes in air speed may be utilized to physically drive the movable mechanism to move the fairing bodies 112A and 112B.

Furthermore, in this embodiment, as shown in FIG. 1, the natural wind detection device 120 detects the direction of the natural wind relative to the vehicle 50, for example, which means that the natural wind detection device 120 detects the angle θ of the direction of the natural wind with respect to the forwarding direction of the vehicle 50 (that is, in front of the front and rear direction X). Preferably, the natural wind detection device 120 is, for example, a sensor, and includes a front detection device 122 disposed in the middle of the front end portion of the vehicle 50 (i.e., the front end portion corresponding to the arrow pointing in the front and rear direction X), and a top detection device 124 disposed at the center of the top of the vehicle 50 (for example, the top plate 56) to detect the pressure value of the natural wind relative to the vehicle 50 (for example, correspondingly detecting pressure values Pc and Pt). Therefore, the natural wind detection device 120 detects the pressure value of the natural wind, and the angle θ of the direction of the natural wind with respect to the forwarding direction of the vehicle 50 is calculated by calculating the pressure value. For example, the direction of the natural wind relative to the vehicle 50 is calculated based on the pressure values Pc and Pt in the detection results through a calculation component that is not shown (for example, consisting of a part of the control device 130). However, the present disclosure does not limit the number, configuration position and implementation means of the natural wind detection devices 120, which may be adjusted according to needs.

In addition, as shown in FIG. 1 and FIG. 2, the control device 130 is, for example, a central control unit or a processing unit disposed in the vehicle 50, and is electrically connected to the natural wind detection device 120. In this way, the detection result detected by the natural wind detection device 120 may be sent to the control device 130 as an electrical signal. If the detection result of the natural wind detection device 120 is the direction of the natural wind relative to the vehicle 50, the control device 130 may control the pair of left and right fairing devices 110A and 110B to move independently in response to the detected direction of the natural wind. If the detection result of the natural wind detection device 120 is the angle θ of the direction of the natural wind relative to the forwarding direction of the vehicle 50, or the pressure value of the natural wind relative to the vehicle 50, the control device 130 may first calculate the detection result to obtain the direction of the natural wind relative to the vehicle 50. Then, the pair of left and right fairing devices 110A and 110B are controlled to move independently in response to the obtained direction of the natural wind. However, the present disclosure does not limit the implementation means of the control device 130, which may be adjusted according to requirements.

Furthermore, as shown in FIG. 1 and FIG. 5, in this embodiment, the purpose of detecting the direction of the natural wind relative to the vehicle 50 by the natural wind detection device 120 is to detect whether there is crosswind in the natural wind flowing through the vehicle 50, that is, detect whether the angle θ of the direction of the natural wind relative to the forwarding direction of the vehicle 50 (i.e., in front of the front and rear direction X) is greater than a preset angle. The angle θ of the direction of the natural wind relative to the forwarding direction of the vehicle 50 is defined, for example, with the central extension line L of the vehicle 50 as the center, wherein the central extension line L extends along the front and rear direction X corresponding to the forwarding direction of the vehicle 50, and the right side of the center extension line L is positive and the left side of the center extension line L is negative. In this way, when the angle θ of the direction of the natural wind relative to the forwarding direction of the vehicle 50 is 0 degrees, it may be regarded that the direction of the natural wind is parallel to the forwarding direction of the vehicle 50 (that is, the direction of the natural wind is parallel to the front and rear direction X). In this way, the vehicle control system 100 may detect the direction of the natural wind flowing through the vehicle 50 relative to the vehicle 50 during the driving process of the vehicle 50 through the natural wind detection device 120, so as to control the positions of the pair of left and right fairing devices 110A and 110B through the control device 130 during the driving process of the vehicle 50. Although the above content points out that the angle θ of the direction of the natural wind relative to the forwarding direction of the vehicle 50 is positive on the right side of the central extension line L and negative on the left side of the central extension line L, the subsequent description of the angle θ of the direction of the natural wind relative to the forwarding direction of the vehicle 50 (for example, the judgment expression in the operation process) is set based on the absolute value of the magnitude of the angle θ (regardless of the left and right directions). However, the present disclosure is not limited thereto and may be adjusted according to needs.

In an example, based on the pressure data detected by the natural wind detection device 120 (such as the pressure values detected by the front detection device 122 and the top detection device 124) and the relative air speed (associated with the speed of vehicle 50) of the vehicle 50 during the driving process, the steps for obtaining information on the wind speed and wind direction of the natural wind acting on the vehicle 50 are described below.

First, as shown in FIG. 5, the wind speed of the natural wind is set as Vwv, the speed components of the natural wind is set as u and v, the speed of the vehicle 50 is set as Vs, the relative air speed of the vehicle 50 during the driving process is set as Vrv, and the angle that the relative air speed Vrv presents with respect to the central extension line L of the vehicle 50, i.e., the yaw angle, is set as ψ.

Then, Bernoulli's theorem is adopted to establish the formula (1) for converting the dynamic pressure value into wind speed, where p is the air density (the air density ρ may be additionally detected, or an appropriate value may be selected according to needs). Vrv is the relative air speed of the vehicle 50 during the driving process (correlated with the speed of the vehicle 50), the pressure value Pc is a pressure value detected by the front detection device 122 (shown in FIG. 1) disposed in the middle of the front end of the vehicle 50, and the pressure value Pt is a pressure value detected by the top detection device 124 (shown in FIG. 1) provided at the center of the top of the vehicle 50.

$$\rho \times (Vrv)^2/2 = Pc - Pt \qquad \text{Formula (1)}$$

Furthermore, the formula (1) is rewritten into the formula (2) to obtain the relative air speed Vrv.

$$Vrv = \sqrt{2(Pc - Pt)/\rho} \qquad \text{Formula (2)}$$

Finally, the relative air speed Vrv, the yaw angle ψ of the relative air speed Vrv relative to the vehicle 50, and the vehicle speed Vs of the vehicle 50 are utilized to obtain the speed components u and v of the natural wind from formula (3).

$$u = Vwvx = Vrv \cos \psi - Vs \qquad \text{Formula (3)}$$
$$v = Vwvy = Vrv \sin \psi$$

In this way, the magnitudes of the speed components u and v of the natural wind may be obtained, thereby obtaining the wind speed Vwv of the natural wind acting on the vehicle 50 and the angle θ of the direction of the natural wind with respect to the forwarding direction of the vehicle 50 (equivalent to the direction of the natural wind).

However, the above description is only one of the procedures for obtaining the wind direction of the natural wind acting on the vehicle 50 through the natural wind detection device 120 shown in FIG. 1 and FIG. 5 and the relevant conditions (e.g., vehicle speed) of the vehicle 50. In other embodiments not shown, the process of obtaining the direction of the natural wind may be adjusted according to the type of the natural wind detection device 120 and the speed of the vehicle 50 (whether the vehicle 50 is running or not), and the present disclosure is not limited thereto.

Furthermore, in this embodiment, the purpose of detecting the direction of the natural wind relative to the vehicle 50 (whether there is crosswind) is to control the pair of left and right fairing devices 110A and 110B to move independently in response to the direction of the natural wind. In an example, when the angle θ of the direction of the natural wind relative to the forwarding direction of the vehicle 50 is greater than the preset angle, the control device 130 controls one of the fairing devices 110A and 110B corresponding to the direction of the natural wind among the pair of left and right fairing devices 110A and 110B to move to the first storage position P1, and controls the other one of the fairing device 110B and the fairing device 110A to move to the first deployment position P2 (as shown in FIG. 4C and FIG. 4D). That is, when the crosswind is large (the angle θ is larger than the preset angle), it is preferable to close the fairing device 110A or the fairing device 110B corresponding to the direction of the natural wind (that is, move to the first storage position P1) to improve the aerodynamic performance of the vehicle 50. Furthermore, while considering the aerodynamic performance of the vehicle 50, the impact of crosswind on the air resistance value is also considered. Therefore, the preset angle is preferably set for the purpose of avoiding the reduction of air resistance value caused by crosswind. Here, as shown in FIG. 7, it is expected to obtain the air resistance value of the vehicle 50 with respect to the direction of the natural wind through simulation or experiment to obtain the preset angle in advance. Specifically, curve 1 refers to the state in which the pair of left and right fairing devices 110A and 110B moves to the first deployment position P2 (open), and curve 2 refers to the state in which one of the fairing devices 110A and 110B moves to the first storage position P1 (closed) state, but the disclosure is not limited thereto. The preset angle is, for example, plus or minus 4.5 degrees centered on the central extension line L of the vehicle 50 (positive to the right, negative to the left), but the preset angle may be adjusted based on the specific structure of the fairing devices 110A and 110B, the relative position between the two, the relative position between the two and the vehicle body 52 of the vehicle 50, and the appearance of the vehicle 50 and other conditions, and the present disclosure is not limited thereto.

Figure 4B:
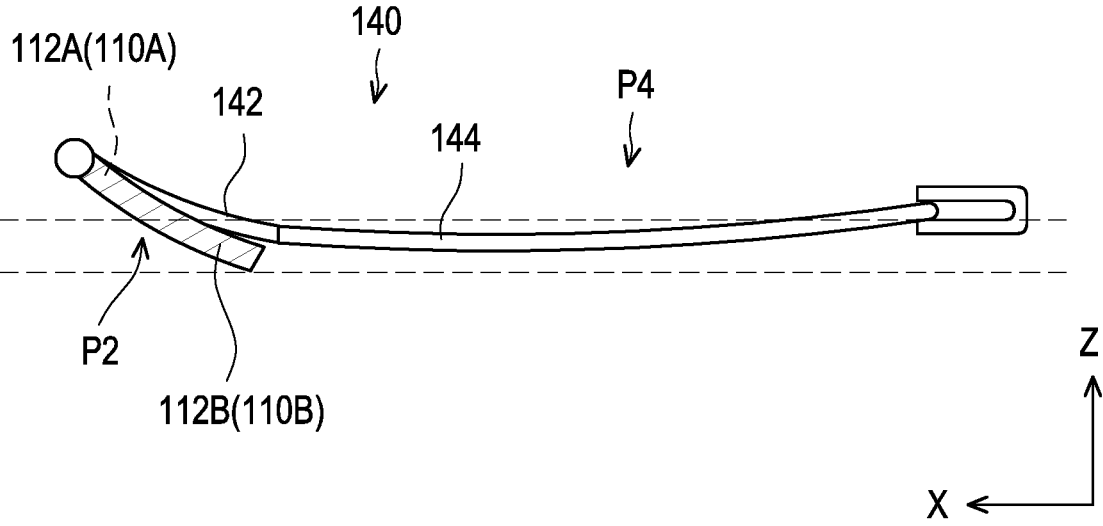
Figure 4C:
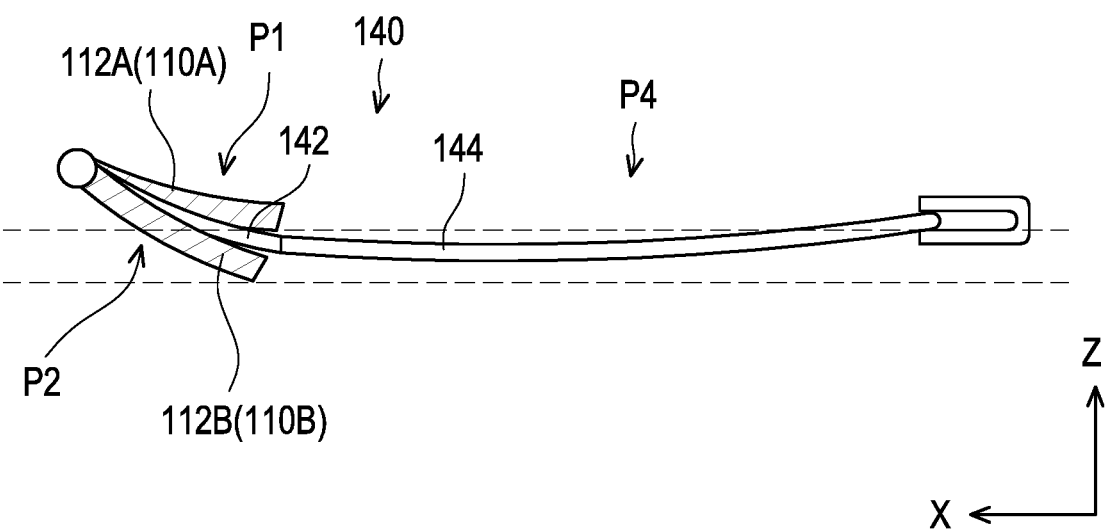
Figure 4D:
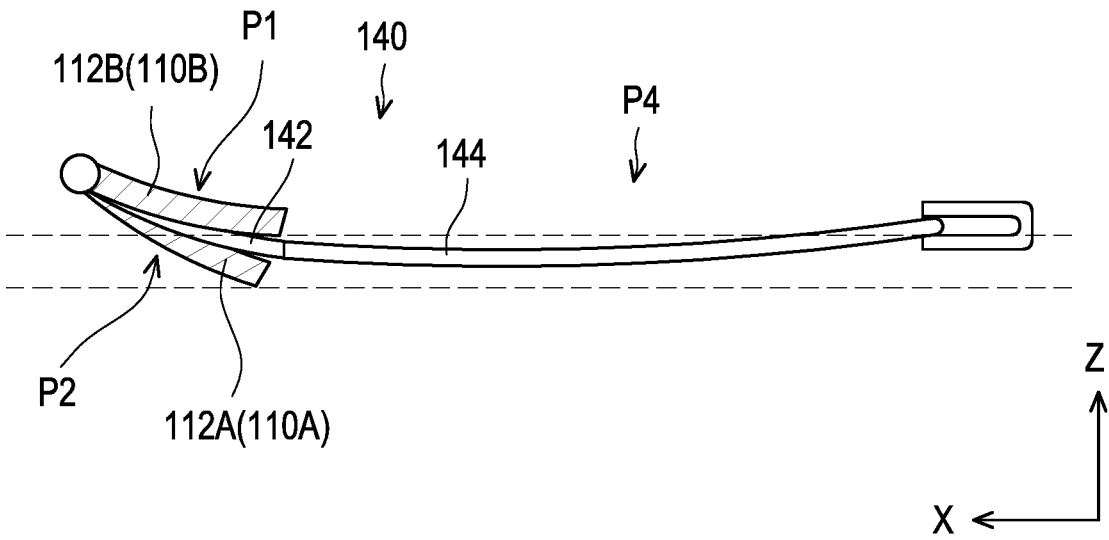

Furthermore, in this embodiment, when the vehicle speed of the vehicle 50 is greater than the first predetermined speed, the control device 130 controls the pair of left and right fairing devices 110A and 110B to move to the first deployment position P2 (as the state shown in FIG. 4B). Under the circumstances, when the vehicle 50 receives natural wind from one of the left and right sides of the vehicle 50, the control device 130 controls one of the pair of left and right fairing devices 110A and 110B corresponding to the direction of the natural wind to move to the first storage position P1, and controls the other one of the fairing device 110B and the fairing device 110A to move to the first deployment position P2 (as shown in FIG. 4C and FIG. 4D). That is to say, under the circumstances, the other one of the fairing device 110B and the fairing device 110A is preferably maintained at the first deployment position P2. For example, when the vehicle 50 is subjected to natural wind from the right side of the vehicle 50 and the angle θ of the direction of the natural wind with respect to the forwarding direction of the vehicle 50 is larger than the preset angle, as shown in FIG. 4C, the control device 130 controls the right fairing device 110A corresponding to the direction of the natural wind to move to the first storage position P1 and controls the left fairing device 110B to maintain in the first deployment position P2. Correspondingly, when the vehicle 50 receives the natural wind from the left side of the vehicle 50 and the angle θ of the direction of the natural wind with respect to the forwarding direction of the vehicle 50 is larger than the preset angle, as shown in FIG. 4D, the control device 130 controls the left fairing device 110B corresponding to the direction of the natural wind to move to the first storage position P1 and controls the right fairing device 110A to maintain in the first deployment position P2. In this way, the vehicle control system 100 may close one of the pair of left and right fairing devices 110A and 110B corresponding to the crosswind according to the direction of the natural wind, thereby further improving the aerodynamics performance of the vehicle 50.

Preferably, in this embodiment, the operation flow of the vehicle control system 100 controlling the pair of left and right fairing devices 110A and 110B according to the direction of the natural wind is as shown in FIG. 6. First, in step S01, when the vehicle speed of the vehicle 50 is greater than the first predetermined speed, a pair of left and right fairing devices 110A and 110B are opened, that is, the control device 130 controls both the fairing devices 110A and 110B to move to the first deployment position P2 (the state shown in FIG. 4B). Next, in step S02, information on the direction of the natural wind is obtained, for example, the angle θ of the direction of the natural wind with respect to the forwarding direction of the vehicle 50 is obtained. Next, in step S03, it is determined whether the vehicle 50 is receiving natural wind from the right side of the vehicle 50 and whether the angle θ of the natural wind being received is greater than a preset angle. If it is determined that the vehicle 50 is subject to the natural wind from the right side of the vehicle 50 and the angle θ of the natural wind is greater than the preset angle (step S03, yes), then step S04 is carried out and the right fairing device 110A is closed, that is, the control device 130 controls the right fairing device 110A to move to the first storage position P1. Under the circumstances, the left fairing device 110B maintains the open state, that is, the left fairing device 110B maintains in the first deployment position P2 (the state shown in FIG. 4C).

After the preset time has elapsed, step S02 is carried out again to obtain information on the direction of the natural wind. Correspondingly, if it is determined that the vehicle 50 is not subjected to the natural wind from the right side of the vehicle 50 or the angle θ of the natural wind the vehicle 50 bears is less than the preset angle (step S03, No), then step S05 is carried out to determine whether the vehicle 50 is subjected to the natural wind from the left side of the vehicle 50 and whether the angle θ of the natural wind endured is greater than the preset angle.

Next, in step S05, if it is determined that the vehicle 50 is receiving natural wind from the left side of the vehicle 50 and the angle θ of the natural wind being received is greater than the preset angle (step S05, yes), then step S06 is carried out to close the left fairing device 110B, that is, the control device 130 controls the left fairing device 110B to move to the first storage position P1. Under the circumstances, the right fairing device 110A maintains the open state, that is, the right fairing device 110A maintains in the first deployment position P2 (the state shown in FIG. 4D). After the preset time has elapsed, step S02 is carried out again to obtain information on the direction of the natural wind. Correspondingly, if it is determined that the vehicle 50 is not subjected to the natural wind from the left side of the vehicle 50, or the angle θ of the natural wind endured is smaller than the preset angle (step S05, No), it is equivalent to that the vehicle 50 is not subjected to the natural wind from any of the left and right sides of the vehicle 50, or the angle θ of the natural wind endured is less than the preset angle, then the fairing devices 110A and 110B are maintained in the open state, that is, the fairing devices 110A and 110B are maintained in the first deployment position P2 (the state shown in FIG. 4B). After the preset time has elapsed, step S02 is carried out again to obtain information on the direction of the natural wind. After the preset time has elapsed and the step S02 is carried out again to obtain information on the direction of the natural wind, the relative relationship between the angle θ of the natural wind and the preset angle (including whether the natural wind is from either the left direction or the right direction of the vehicle 50) may be determined again by referring to the aforementioned process, so as to determine which one of the fairing devices 110A and 110B is to be opened or closed (controlled independently) until the vehicle 50 stops running.

Although the above process is performed based on the direction of the natural wind (one of the left and right sides) the vehicle 50 is subjected to and the preset angle to control the fairing devices 110A and 110B to move independently to the first storage position P1 and the first deployment position P2 (that is, the states of the fairing devices 110A and 110B are controlled), in other embodiments not shown, the fairing devices 110A and 110B may be controlled to independently move to multiple positions between the first storage position P1 and the first deployment position P2 based on multiple preset angles (multi-stage control), so that the airflow guided by the pair of left and right fairing devices 110A and 110B may be more precisely adjusted. Moreover, the above process is to first turn on a pair of left and right fairing devices 110A and 110B, and after the vehicle 50 starts running and the information on the direction of the natural wind is obtained, based on the information on the direction of the natural wind and the judgment result of the angle θ of the natural wind and the preset angle, it may be decided whether to maintain the open state of the pair of left and right fairing devices 110A and 110B, or to decide whether to close one of the fairing devices 110A and 110B corresponding to the direction of the natural wind. However, in other embodiments not shown, a pair of left and right fairing devices 110A and 110B may be closed first, and after the vehicle 50 starts running and information on the direction of the natural wind is obtained, based on the information on the direction of the natural wind and the judgment result of the angle θ of the natural wind and the preset angle, it may be decided whether to maintain the closed state of one of the fairing devices 110A and 110B corresponding to the direction of the natural wind, or to decide whether to open a pair of left and right fairing devices 110A and 110B.

Furthermore, although the above process does not mention the conditions under which the control device 130 controls both the left and right fairing devices 110A and 110B to move to the first storage position P1 (as shown in FIG. 4A), in other embodiments that are not shown, when there is natural wind with an angle θ greater than the preset angle on both left and right sides of the vehicle 50 (that is, there is crosswind on both left and right sides), the control device 130 may also control the fairing devices 110A and 110B to move to the first storage position P1 (i.e., the fairing devices 110A and 110B are closed). Alternatively, when the vehicle 50 stops running, the pair of left and right fairing devices 110A and 110B may be closed. However, the above operation process for the vehicle control system 100 to control the pair of left and right fairing devices 110A and 110B in response to the direction of the natural wind may adjusted depending on the specific structure of the fairing devices 110A and 110B, the relative position between them, the relative position between them and the vehicle body 52 of the vehicle 50, and the appearance of the vehicle 50 and other conditions. The present disclosure does not limit the specific means of controlling the moving positions of the fairing devices 110A and 110B according to the direction of the natural wind, which may be adjusted according to needs.

In an example, in this embodiment, as shown in FIG. 3 to FIG. 4D, the vehicle control system 100 further includes a central air deflector device 140. The central air deflector device 140 is suitable for being disposed on the body 52 of the vehicle 50 as an exterior device to stabilize the airflow flowing through the vehicle 50, thereby improving the aerodynamic performance of the vehicle 50. Specifically, the central air deflector device 140 is disposed at a middle position of the vehicle width direction (i.e., the left and right direction Y) of the vehicle 50 and between a pair of left and right fairing devices 110A and 110B, and the central air deflector device 140 is movable between the second storage position P3 under the vehicle 50 and the second deployment position P4 protruding from the second storage position P3 to the lower part of the vehicle 50 (as shown in FIG. 4A to FIG. 4D). Furthermore, the control device 130 controls the movement of the central air deflector device 140. In this way, the vehicle control system 100 further considers the impact of the relative relationship (opening or closing) between the left and right fairing devices 110A and 110B and the central air deflector device 140 on the airflow at the lower end of the vehicle 50 to control the movement of the left and right fairing devices 110A and 110B and the central air deflector device 140 in response to the direction of the natural wind.

Specifically, in this embodiment, the central air deflector device 140 includes, for example, a front air deflector body 142 and a rear air deflector body 144 (for example, each of them consists of a single plate or a combination of multiple plates) disposed between a pair of left and right fairing devices 110A and 110B, and a movable mechanism not shown (for example, a linkage mechanism, a sliding mechanism, etc.), and is electrically connected to the control device 130 to be movable between the second storage position P3 and the second deployment position P4 through the control of the control device 130. The pair of left and right fairing devices 110A and 110B and the central air deflector device 140 are, for example, a vehicle bottom structure (as shown in FIG. 3) disposed at the lower front end of the vehicle body 52 and are arranged side by side in the left and right direction Y. For example, when the vehicle speed of the vehicle 50 does not reach the second predetermined speed, etc., when the central air deflector device 140 moves to the second storage position P3 under the control of the control device 130, the front air deflector body 142 and the rear air deflector body 144 of the central air deflector device 140 are stored under the vehicle 50 and are arranged parallel to each other in the front and rear direction X (as shown in FIG. 3 and FIG. 4A). Furthermore, for example, when the vehicle speed of the vehicle 50 is equal to or higher than the second predetermined speed, when the central air deflector device 140 moves to the second deployment position P4 under the control of the control device 130, the front air deflector body 142 and the rear air deflector body 144 of the central air deflector device 140 are driven by the movable mechanism to protrude from the second storage position P3 toward the lower part of the vehicle 50, for example, the front air deflector body 142 rotates centered on the front end side to move the rear end side downward, and drives the front end side of the rear air deflector body 144 to move downward so that the rear end side moves forward (as shown in FIG. 4B to FIG. 4D), thereby changing the airflow surrounding the central air deflector device 140. However, the central air deflector device 140 may also be provided with only one air deflector body like the fairing devices 110A and 110B. The present disclosure does not limit the specific structure of the central air deflector device 140, which may be adjusted according to needs. In addition, the second predetermined speed may be the same as or different from the first predetermined speed for moving the pair of left and right fairing devices 110A and 110B.

Furthermore, in this embodiment, the control device 130 changes the state of the pair of left and right fairing devices 110A and 110B according to the direction of the natural wind, and further changes the state of the central air deflector device 140. Specifically, in the condition where one of the pair of left and right fairing devices 110A and 110B corresponding to the direction of the natural wind moves to the first storage position P1, and the other one of the pair of left and right fairing devices 110A and 110B moves to the first deployment position P2, the control device 130 controls the central air deflector device 140 to move to the second deployment position P4. That is to say, as shown in FIG. 4C and FIG. 4D, when one of the fairing devices 110A and 110B is closed, if the other fairing device 110B or 110A is opened, it is preferable to open the central air deflector device 140 as well, thereby closing only one of the fairing devices 110A and 110B corresponding to the direction of the natural wind. Furthermore, as shown in FIG. 4B, when both the fairing devices 110A and 110B move to the first deployment position P2 (i.e., the fairing devices 110A and 110B are opened), it is preferable to move the central air deflector device 140 to the second deployment position P4 (i.e., the central air deflector device 140 is opened), thereby opening the fairing devices 110A and 110B and the central air deflector device 140. Similarly, as shown in FIG. 4A, when both the fairing devices 110A and 110B are moved to the first storage position P1 (that is, the fairing devices 110A and 110B are closed), it is preferable to move the central air deflector device 140 to the second storage position P3 (i.e., the central air deflector device 140 is closed), thereby closing the fairing devices 110A and 110B and the central air deflector device 140. In this way, the aerodynamic performance of the vehicle 50 may be further improved.

That is to say, in this embodiment, on the basis of improving the aerodynamic performance of the vehicle 50, the vehicle control system 100 preferably opens the left and right fairing devices 110A and 110B and the central air deflector device 140 when the vehicle 50 is running (as shown in FIG. 4B), but the vehicle control system 100 may close one of the fairing devices 110A and 110B corresponding to the natural wind according to the direction of the natural wind to reduce the impact of the crosswind on the air resistance value. Under the circumstances, it is preferable to use the central air deflector device 140 in the open state to assist the other fairing device 110B or the fairing device 110A in the open state, so that only one of the fairing devices 110A and 110B corresponding to the direction of the natural wind is in a closed state (as shown in FIG. 4C and FIG. 4D), thereby further improving the aerodynamic performance of the vehicle 50. When there is crosswind on both left and right sides, or the vehicle 50 stops running, the pair of left and right fairing devices 110A and 110B and the central air deflector device 140 may be closed (as shown in FIG. 4A). However, since the left and right fairing devices 110A and 110B and the central air deflector device 140 may be moved independently through the control of the control device 130, in addition to the states shown in FIG. 4A to FIG. 4D, the left and right fairing devices 110A and 110B and the central air deflector device 140 may have different combinations of states (open or closed). The present disclosure provides no limitation thereto, and the different combinations of states may be adjusted according to needs. Moreover, it will suffice as long as the pair of left and right fairing devices 110A and 110B and the central air deflector device 140 may be moved between their respective storage positions and deployment positions, and it is possible that the pair of left and right fairing devices 110A and 110B and the central air deflector device 140 may maintain in the middle position between their respective storage and deployment positions in response to the conditions of driving wind or natural wind.

In addition, in this embodiment, FIG. 4A shows that the first storage positions P1 of the left and right fairing devices 110A and 110B are the same (overlapping each other in the left and right direction), and FIG. 4B shows that the first deployment positions P2 of the left and right fairing devices 110A and 110B are the same (overlapping each other in the left and right direction). However, in other embodiments that are not shown, at least the first deployment position P2 of the left and right fairing devices 110A and 110B may be different, that is, the downward deployment amount (protrusion amount) of the left and right fairing devices 110A and 110B may be different (not overlapping each other in the left and right direction). Alternatively, the size and structure of the left and right fairing devices 110A and 110B may be different. Similarly, FIG. 4A shows that the first storage position P1 of the fairing devices 110A and 110B is the same as the second storage position P3 of the central air deflector device 140 (overlapping each other in the left and right direction), and FIG. 4B shows that the first deployment position P2 of the fairing devices 110A and 110B is different from the second deployment position P4 of the central air deflector device 140 (not overlapping each other in the left and right direction). For example, the downward deployment amount (protrusion amount) of the fairing devices 110A and 110B is greater than the downward deployment amount (protrusion amount) of the central air deflector device 140. However, in other embodiments that are not shown, the first deployment position P2 of the fairing devices 110A and 110B may be the same as the second deployment position P4 of the central air deflector device 140 (overlapping each other in the left and right direction). Alternatively, the central air deflector device 140 may be omitted, and the left and right fairing devices 110A and 110B may be separated from each other or arranged side by side in the left and right direction Y. The present disclosure is not limited thereto, and the above arrangement may be adjusted according to needs.

It can be seen from the above that in the vehicle control system 100 of this embodiment, the left and right fairing devices 110A and 110B may respectively move to the first storage position P1 or the first deployment position P2 in response to the direction of the natural wind, so that the airflow guided by the left and right fairing devices 110A and 110B is more precisely adjusted according to the actual situation. In particular, during the driving process of the vehicle 50, according to the direction of the natural wind and driving requirements (for example, for the setting of the preset angle and the preset time, etc.), the control device 130 controls the movement of the pair of left and right fairing devices 110A and 110B according to the direction of the natural wind detected by the natural wind detection device 120. Since the preset angle is set for the purpose of avoiding the reduction of air resistance value caused by crosswind, when the crosswind is large (the angle θ is larger than the preset angle), it is preferable to make one of the fairing devices 110A and 110B corresponding to the direction of the natural wind to move to the first storage position P1 (that is, one of the fairing devices 110A and 110B corresponding to the direction of the natural wind is closed), thereby further improving the aerodynamic performance of the vehicle 50. In this way, the vehicle 50 may achieve optimal aerodynamic performance regardless of natural wind conditions (wind speed, wind direction). Accordingly, the vehicle control system 100 may improve the aerodynamic performance of the vehicle 50.

To sum up, in the vehicle control system of the present disclosure, the left and right fairing devices are respectively movable between the first storage position under the vehicle and the first deployment position protruding from the first storage position toward the lower part of the vehicle. The natural wind detection device detects the direction of the natural wind relative to the vehicle, and the control device controls the left and right pair of fairing devices to move independently in response to the direction of the natural wind. Preferably, when the vehicle is subjected to natural wind from one of the left and right sides of the vehicle, the control device controls one of the pair of left and right fairing devices corresponding to the direction of the natural wind to move to the first storage position. Furthermore, a central air deflector device may be provided that is movable between the second storage position and the second deployment position, and the state of the central air deflector device may be changed according to the state of the pair of left and right fairing devices. In this way, the left and right fairing devices may respectively move to their respective storage positions or deployment positions in response to the direction of the natural wind, thereby more accurately adjusting the airflow guided by the left and right pair of fairing devices according to the actual situation. In this way, the vehicle control system of the present disclosure may improve the aerodynamic performance of the vehicle.

Finally, it should be noted that the above embodiments are only used to illustrate the technical solution of the present disclosure, but not to limit it; although the present disclosure has been described in detail with reference to the foregoing embodiments, those of ordinary skill in the art should understand that the technical solutions described in the foregoing embodiment may still be modified, or some of them or all of them may be replaced equivalently. However, these modifications or substitutions do not cause the essence of the corresponding technical solutions to depart from the scope of the technical solutions of the embodiments of the present disclosure.

What is claimed is:

1. A vehicle control system, comprising:
   a pair of left and right fairing devices disposed in front of a pair of left and right wheels of a vehicle, and are each movable between a first storage position under the vehicle and a first deployment position protruding from the first storage position toward a lower part of the vehicle;
   a natural wind detection device disposed on the vehicle to detect a direction of a natural wind relative to the vehicle; and
   a control device disposed on the vehicle and controlling the pair of left and right fairing devices to move independently in response to the direction of the natural wind, wherein
   when the vehicle is subjected to the natural wind from one of left and right sides of the vehicle, the control device controls one of the pair of left and right fairing devices corresponding to the direction of the natural wind to move to the first storage position, and controls the other of the pair of fairing devices to move to the first deployment position.

2. The vehicle control system according to claim 1, wherein the natural wind detection device detects an angle of the direction of the natural wind relative to a forwarding direction of the vehicle.

3. The vehicle control system according to claim 2, wherein when the vehicle is subjected to the natural wind from one of left and right sides of the vehicle, the control device controls one of the pair of left and right fairing devices corresponding to the direction of the natural wind to move to the first storage position, and controls the other of the pair of fairing devices to move to the first deployment position.

4. The vehicle control system according to claim 1, further comprising:
   a central air deflector device disposed in a middle position of a vehicle width direction of the vehicle and between the pair of left and right fairing devices, and movable between a second storage position under the vehicle and a second deployment position protruding from the second storage position to the lower part of the vehicle,
   wherein the control device controls a movement of the central air deflector device, and
   when the other fairing device of the pair of left and right fairing devices moves to the first deployment position, the control device controls the central air deflector device to move to the second deployment position.

5. A vehicle control system, comprising:
   a pair of left and right fairing devices disposed in front of a pair of left and right wheels of a vehicle, and are each movable between a first storage position under the vehicle and a first deployment position protruding from the first storage position toward a lower part of the vehicle;

a natural wind detection device disposed on the vehicle to detect a direction of a natural wind relative to the vehicle; and a control device disposed on the vehicle and controlling the pair of left and right fairing devices to move independently in response to the direction of the natural wind, wherein the natural wind detection device detects an angle of the direction of the natural wind relative to a forwarding direction of the vehicle, the natural wind detection device detects a pressure value of the natural wind, and the angle of the direction of the natural wind relative to the forwarding direction of the vehicle is determined by calculating the pressure value.

6. The vehicle control system according to claim 5, wherein when the vehicle is subjected to the natural wind from one of left and right sides of the vehicle, the control device controls one of the pair of left and right fairing devices corresponding to the direction of the natural wind to move to the first storage position, and controls the other of the pair of fairing devices to move to the first deployment position.

7. A vehicle control system, comprising:

a pair of left and right fairing devices disposed in front of a pair of left and right wheels of a vehicle, and are each movable between a first storage position under the vehicle and a first deployment position protruding from the first storage position toward a lower part of the vehicle;

a natural wind detection device disposed on the vehicle to detect a direction of a natural wind relative to the vehicle; and a control device disposed on the vehicle and controlling the pair of left and right fairing devices to move independently in response to the direction of the natural wind, wherein the natural wind detection device detects an angle of the direction of the natural wind relative to a forwarding direction of the vehicle, when the angle of the direction of the natural wind relative to the forwarding direction of the vehicle is greater than a preset angle, the control device controls one of the pair of left and right fairing devices corresponding to the direction of the natural wind to move to the first storage position.

\* \* \* \* \*